I. M. UPPERCU.
TESTING STAND FOR AUTOMOBILES.
APPLICATION FILED JAN. 20, 1910.
984,050.
Patented Feb. 14, 1911.
4 SHEETS—SHEET 1.
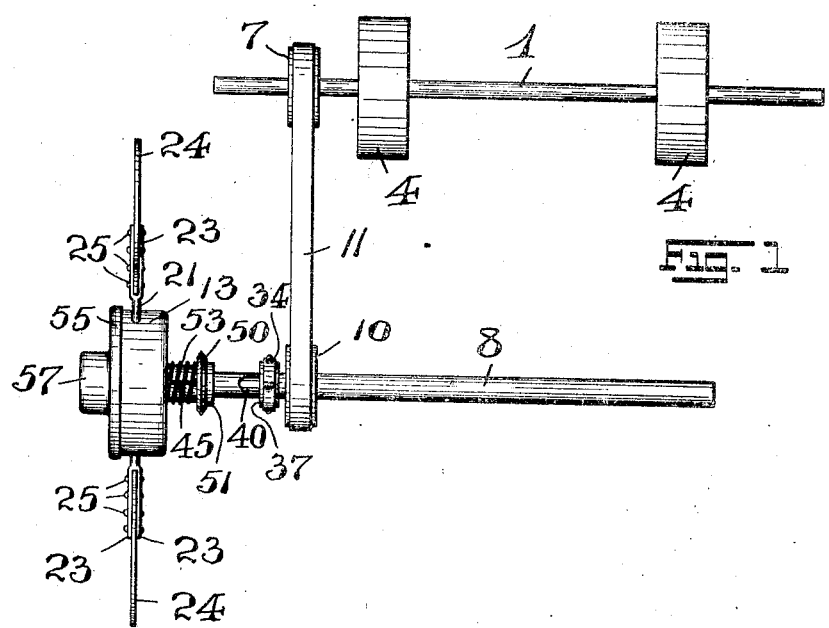
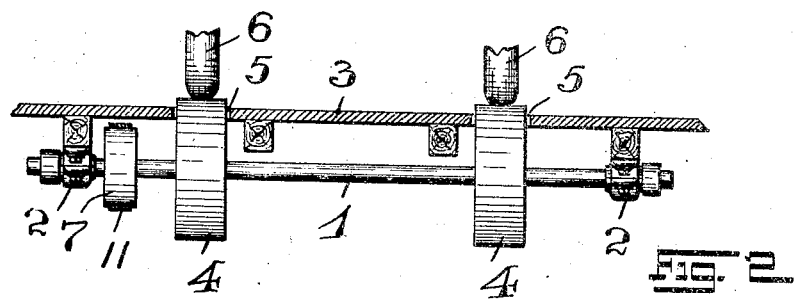
WITNESSES:
Fred'k H. W. Fraentzel
Anna H. Alter
INVENTOR:
Inglis M. Uppercu,
BY
Fraentzel and Richards,
ATTORNEYS

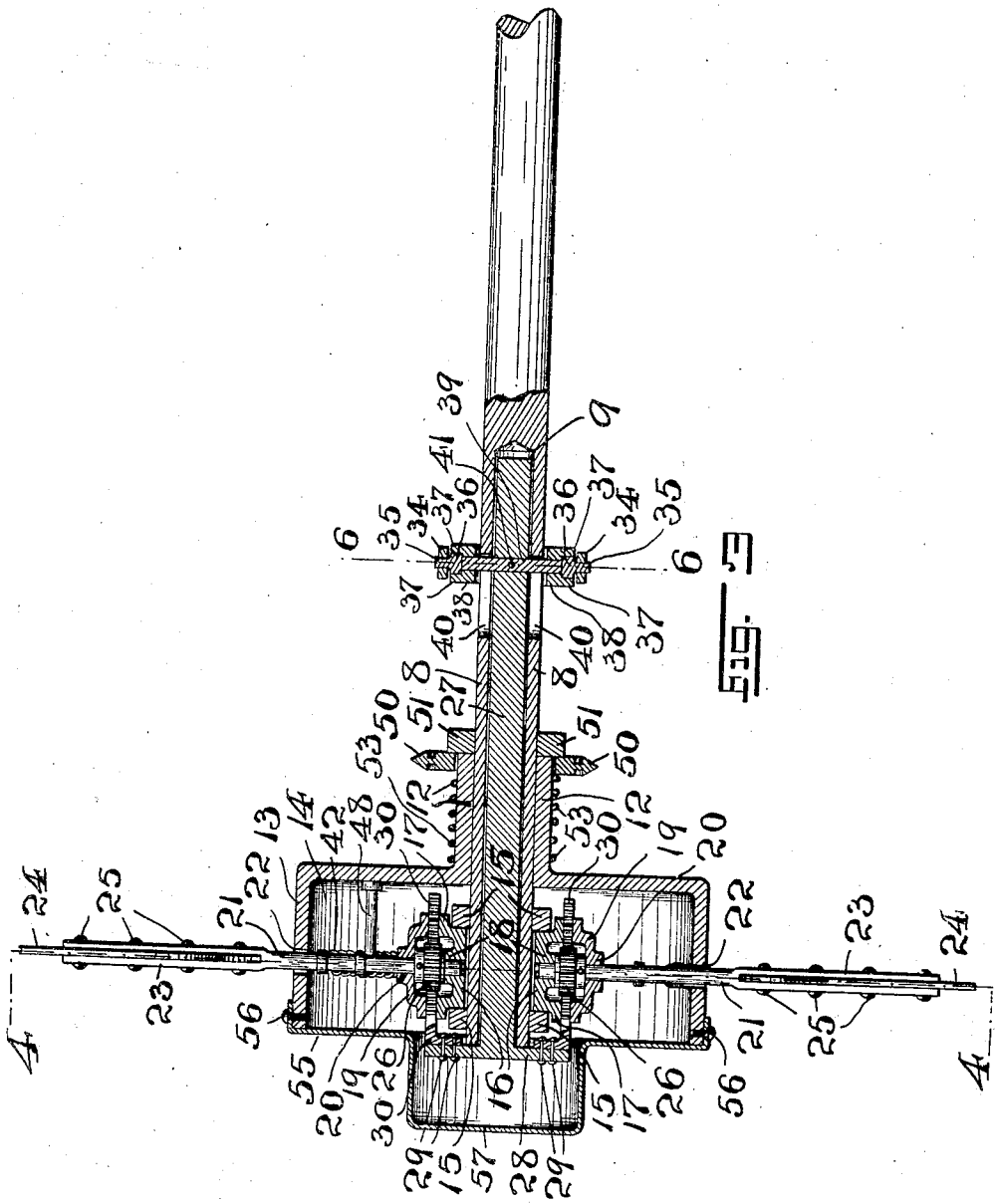

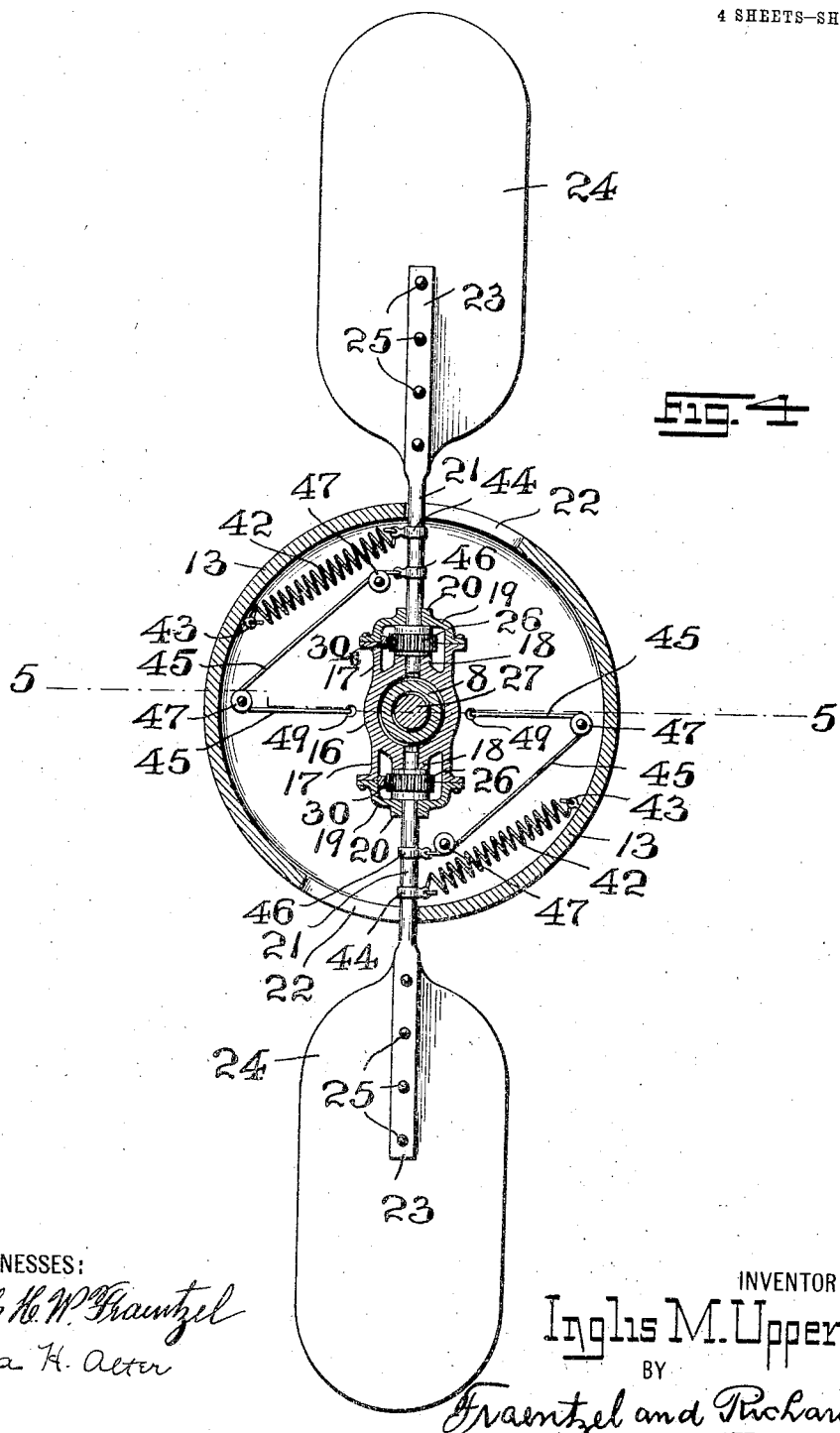

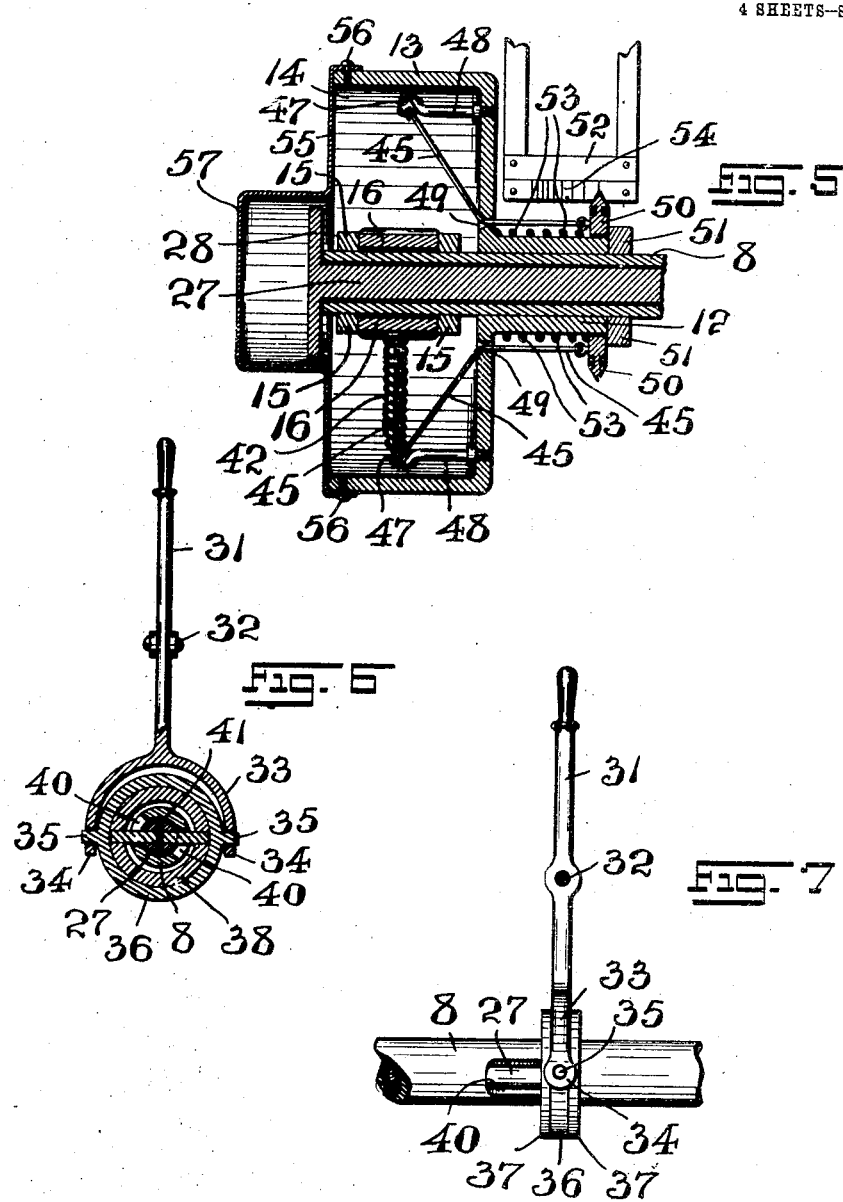

UNITED STATES PATENT OFFICE.

INGLIS M. UPPERCU, OF NEWARK, NEW JERSEY.

TESTING-STAND FOR AUTOMOBILES.

984,050.　　　　　Specification of Letters Patent.　　Patented Feb. 14, 1911.

Application filed January 20, 1910. Serial No. 539,131.

*To all whom it may concern:*

Be it known that I, INGLIS M. UPPERCU, a citizen of the United States, residing at Newark, in the county of Essex and State of New Jersey, have invented certain new and useful Improvements in Testing-Stands for Automobiles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvement in automobile-testing stands, adapted, more especially, for in-door uses; and, the present invention has reference, more particularly, to a novel construction of automobile-testing stand adapted to test the mechanical efficiency of an automobile, by applying the driving power of said automobile to said testing stand or apparatus.

The invention has for its principal object to provide an adjustable testing-stand for automobiles, by means of which the mechanical efficiency of the power and operative parts of an automobile may be tested under conditions which approximate road-conditions, the testing mechanism being adapted to be regulated and adjusted so that the efficiency of the power and operative parts of said automobile may be properly tested on any of its various driving speeds.

The invention has for its further object to provide in connection with a testing-stand, an adjustable resistance-member whereby the testing stand may be caused to provide various degrees of resistance to the operation of said driving mechanism of an automobile. For example, when testing an automobile driven on its high speed, a certain amount of resistance is afforded by said testing-stand, but when the said automobile is driven at its variously reduced speeds, down to its low speed, the resistance of said testing-stand may be variously increased until its highest resisting power may be provided, when driving the automobile at low speed, thus providing a testing-stand which produces various degrees of resistance corresponding approximately to various road-conditions, and such other conditions as require the use of various speeds in driving an automobile.

Other objects of this invention not at this time more particularly enumerated, will be clearly understood from the following detailed description of the present invention.

With the various objects of my present invention in view, the same consists, primarily, in the novel automobile testing-stand adapted to provide a variable resistance, as will hereinafter more fully appear; and, the invention consists, furthermore, in the novel arrangements and combinations of the devices and parts, as well as in the details of the construction of the same, all of which will be fully set forth in the following specification and then finally embodied in the clauses of the claim which are appended to and which form an essential part of this specification.

The invention is clearly illustrated in the accompanying drawings, in which:—

Figure 1 is a semi-diagrammatic plan view of the mechanical features, construction, and arrangement of the novel testing-stand for automobiles showing one embodiment of the principles of the present invention. Fig. 2 is a detail cross-section of the device illustrating an arrangement of the driving shaft of the said novel testing stand. Fig. 3 is a detail longitudinal vertical section of the adjustable resistance-member of said novel testing stand, said view being made on an increased scale. Fig. 4 is a cross-section, taken on line 4—4 in said Fig. 3, looking in the direction of the arrow $x$. Fig. 5 is a horizontal section, taken on line 5—5 in said Fig. 4, looking in a downward direction. Fig. 6 is a transverse vertical section of a shifting lever and mechanism for operating the resistance member of said novel testing stand, to increase or decrease the resistance thereof, said section being taken on line 6—6 in said Fig. 3. Fig. 7 is a side elevation of said shifting lever and mechanism for operating the resistance-member.

Similar characters of reference are employed in all of the above described views, to indicate corresponding parts.

Referring now to the several figures of the said drawings, the reference-character 1 indicates a main driving shaft, the same being preferably mounted in suitable bearings 2 secured beneath the flooring 3 of a garage, or other suitable place. Secured upon said shaft 1 are a pair of driving pulleys 4, the same projecting through suitable spaces or cut-away portions 5 in said flooring 3, so that their outer peripheral surfaces are raised slightly above the surface of the said flooring 3. The said driving pulleys 4 are spaced apart so as to permit the rear or driving wheels 6 of an automobile to be brought in operative rolling contact therewith. Secured in a suitable location upon said main driving shaft 1 is a transmission pulley 7. Mounted in any convenient location, with relation to said main driving shaft 1, is a counter-shaft 8, the same being provided at one end with a hollow or chambered portion 9, and arranged upon said counter-shaft 8 is a transmission pulley 10, the same being adapted to be connected by a belting 11, or other transmission means, with the transmission pulley 7 of said main driving shaft 1, for the purpose of transmitting the motion of said main driving-shaft 1 to the said counter-shaft 8. Rigidly secured upon said counter-shaft 8, by means of its hub-member 12, is a drum 13 which is provided with a chambered part 14 into which projects the free end of the said counter-shaft 8. Suitably secured upon said counter-shaft 8, within said chambered part 14, are a pair of collars 15, and mounted between said collars 15 upon said counter-shaft 8, so as to turn freely thereon, is a hub-member 16 carrying housings 17 which are provided with bearing-portions 18. Said housings are further provided with removable cap-like members 19 which are also provided with bearing-portions 20. Mounted in the bearing-portions 18 and 20 of said housings 17 and cap-like members 19, respectively, so as to turn freely therein, are outwardly extending spindles or shafts 21, which extend through suitably located slotted portions 22 in the walls of said drum 13, and are provided at their outer free ends with forked portions 23 adapted to receive suitably formed fan-blades 24, said blades being secured to said spindles or shafts 21 by means of rivets 25, or other suitable fastening devices. While the drawings show but a single pair of oppositely extending housings 17 and spindles or shafts 21, it will be readily understood that the number of housings and spindles or shafts 21, as well as the blades 24, may be increased to three or four, if desired. Secured upon each of said spindles or shafts 21 and within said housings 17 is a pinion 26. Slidably arranged within the hollow or chambered portion 9 of said counter-shaft 8 is a slidably arranged shaft 27 which is provided at its free and outwardly projecting end with a disk-portion 28 preferably integrally formed therewith. Secured by means of rivets 29, or other suitable fastening devices, to said disk-portion 28 are rack-members 30, the same projecting backwardly through said housings 17 and meshing with said pinions 26 secured to said spindles or shafts 21. By shifting said shaft 27 outwardly, the said rack-members 30 operate said pinions 26 so to turn said spindles or shafts 21, and consequently shift the said fan-blades 24 from a position in which their edges are presented to the plane of revolution of said drum 13 to various other positions, until the flat surfaces of the said fan-blades 24 are presented to the plane of revolution of said drum 13, whereby the resistance of said fan-blades 24 beating upon the air as they are revolved may be increased or decreased at will. The means for so shifting said sliding shaft to accomplish the above set forth results, comprises a shifting lever 31, the fulcrum 32 of which may be located at any convenient stationary point with relation to said counter-shaft 8. The said shifting-lever 31 is provided at one end with a yoke-like portion 33, provided at its ends with the perforated ears 34 adapted to operatively receive the studs 35 of a slip-ring 36. Said slip-ring 36 is operatively arranged between the flanges 37 of a collar-member 38 which is secured by means of a supporting pin or rod 39 to said sliding-shaft 27, the said pin or rod 39 passing through suitably slotted portions 40 in the said counter-shaft 8, said slotted portions 40 being wide enough to allow a certain free turning of said counter-shaft 8, before the said sliding-shaft 27 begins to turn with it. Said pin or rod 39 is rigidly connected with said sliding shaft 27 by means of the transverse pin 41, or other suitable fastening device. It will readily be understood, that by operating the shifting-lever 31, and the mechanism connected therewith, the said sliding-shaft 27 may be easily moved to operate said rack-members 30, and consequently turn the said fan-blades 24, through the intermediate devices, at any desired angle so as to increase or decrease the resistance thereof, even while the said counter-shaft 8, drum 13, and the fan-members are in motion.

In order to measure the degree of resistance offered by the fan-members during the operation of the testing-stand, and to use such measurements in testing the mechanical efficiency of the driving-mechanism of an automobile, the following mechanism is provided:

Secured within said chambered part 14 of said drum 13 are coil-springs 42, one end of each spring being secured to an eyelet-member 43 connected with said drum 13 and the other end of each spring being secured to an eyelet member 44 secured upon the fan-shafts or spindles 21. The movement or revolution of said counter-shaft 8 is not imparted directly to said fan-members, but the counter-shaft 8 revolves the drum 13 which is rigidly secured thereon; and, the springs 42 being anchored to said drum 13 they exert a pull upon the fan-shafts or spindles 21, thereby pulling the same around. As the fan-blades are caused to offer greater resistance to the air through which they travel, by being adjusted as above described, a greater tension is placed upon said springs 42 which causes the said springs to distend; hence, the purpose of said slotted portions 22 in said drum 13, which permit a forward movement of the drum 13 until the tension of said springs 42 and the resistance of said fan-members are balanced, whereupon the fans and the drum revolve together. The means of measuring the tension of said springs 42, and consequently the resistance of said fan-members comprises suitable cords 45, or other flexible connecting medium, the same being secured to an eyelet-member 46 affixed to said fan-shafts or spindles 21. The said cords 45 pass over suitable idlers or wheels 47 supported upon standards or supporting arms 48 which are affixed to said drum 13, the free ends of said cords passing through suitable perforations 49 in the wall of said drum 13 adjacent to its hub-member 12, and being secured to an indicator-disk 50 slidably mounted upon said hub-member 12. Said indicator-disk 50 is maintained and returned to its normal initial position against a collar 51 secured upon said counter-shaft 8 by means of a coil-spring 53 arranged upon said hub-member 12 between said indicator-disk 50 and the wall of said drum 13. As the drum 13 moves in relation to said fan-shafts 21, a pull is exerted upon said cords 45 which is transmitted to said indicator-disk 50 and which is thereby caused to travel forward upon said hub-member 12. Secured to any suitable point which is stationary with relation to said counter-shaft 8 and drum 13, is a board 52 provided with a suitable scale or graduations 54. The greater the resistance of the fan-members, the more the springs 42 must distend before said fan-members are caused to move, and consequently the farther along the drum 13 moves before the fan-members move, the proportionate advance movement of said drum 13 is correspondingly indicated by a movement of said indicator-disk 50 along the hub-member 12, the said indicator-disk 50 indicating on the scale 54, the variable resistance of said fan-members. By comparing the resistance of the testing stand with the speed of the automobile the efficiency of the automobile and its driving mechanism may be easily determined. Furthermore, the resistance of the testing stand to the operation of the automobile being variable or adjustable, the said testing-stand may be easily adjusted to test the efficiency of said automobile when driven at its various speeds. The open end of said drum 13 is closed by means of a closure or cover 55, the same being secured at its flanged periphery by means of screws 56, or other suitable fastening means, to said drum 13. Said closure or cover 55 is further provided with a centrally located pressed-out portion 57 to permit of the free movement of said sliding-shaft 27 and its disk-portion 28 within said drum 13, as above described.

I am fully aware that changes may be made in the various arrangements and combinations of the devices and parts, as well as in the details of the construction of the same without departing from the scope of my present invention as set forth in the foregoing specification and as defined in the appended claims. Hence, I do not limit my invention to the exact arrangements and combinations of the devices and parts as described in the foregoing specification, nor do I confine myself to the exact details of the construction of the various parts as illustrated in the accompanying drawings.

I claim:—

1. A testing stand for automobiles and the like, comprising a main driving shaft, a pair of driving pulleys secured upon said main driving shaft, said driving pulleys being adapted to be operated by the driving wheels of an automobile or the like, a counter-shaft provided with a hollow or chambered end, means for driving said counter-shaft from said main driving shaft, a drum provided with elongated slots in its circumferential wall secured to said counter-shaft, a housing loosely mounted upon said counter-shaft within said drum, movable fan-shafts supported by said housing, said fan-shafts passing through the respective elongated slots in said circumferential wall of said drum, fan-blades, and a yieldable means connecting the said drum with said fan-shafts for imparting the revolving movement of said drum to said fan-shafts and fan-blades, substantially as and for the purposes set forth.

2. A testing stand for automobiles and the like, comprising a main driving shaft, a pair of driving pulleys secured upon said main driving shaft, said driving pulleys being adapted to be operated by the driving wheels of an automobile or the like, a counter-shaft provided with a hollow or chambered end, means for driving said counter-shaft from said main driving shaft, a drum provided with elongated slots in its circumferential wall secured to said counter-shaft, a housing loosely mounted upon said counter-shaft within said drum, movable fan-shafts supported by said housing, said fan-shafts passing through the respective elongated slots in said circumferential wall of said drum, fan-blades, and a yieldable means connecting the said drums with said fan-shafts for imparting the revolving movement of said drum to said fan-shafts and fan-blades, and means for revolving said fan-shafts to turn said fan-blades for the purpose of increasing or decreasing the resistance thereof when revolved in the air, substantially as and for the purposes set forth.

3. A testing stand for automobiles and the like, comprising a main driving shaft, a pair of driving pulleys secured upon said main driving shaft, said driving pulleys being adapted to be operated by the driving wheels of an automobile or the like, a counter-shaft provided with a hollow or chambered end, means for driving said counter-shaft from said main driving shaft, a drum provided with elongated slots in its circumferential wall secured to said counter-shaft, a housing loosely mounted upon said counter-shaft within said drum, movable fan-shafts supported by said housing, said fan-shafts passing through the respective elongated slots in said circumferential wall of said drum, fan-blades, and a yieldable means connecting the said drums with said fan-shafts for imparting the revolving movement of said drum to said fan-shafts and fan-blades, means for revolving said fan-shafts to turn said fan-blades for the purpose of increasing or decreasing the resistance thereof when revolved in the air, and means connected with said drum and said fan-shafts for measuring and indicating the resistance so produced, substantially as and for the purposes set forth.

4. A testing stand for automobiles and the like, comprising a main driving shaft, a pair of driving pulleys secured upon said main driving shaft, said driving pulleys being adapted to be operated by the driving wheels of an automobile or the like, a counter-shaft provided with a hollow or chambered end, means for driving said counter-shaft from said main driving shaft, a drum provided with elongated slots in its circumferential wall secured to said counter-shaft, a housing loosely mounted upon said counter-shaft within said drum, movable fan-shafts supported by said housing, said fan-shafts passing through the respective elongated slots in said circumferential wall of said drum, fan-blades secured on the free ends of said fan-shafts, a pinion upon each fan-shaft, a sliding shaft arranged in the hollow or chambered end of said counter-shaft, rack-members connected with said sliding shaft and meshing with said pinions on said fan-shafts, means for slidably operating said sliding shaft and said rack-members, and a yieldable means connecting the said drums with said fan-shafts for imparting the revolving movement of said drum to said fan-shafts and fan-blades, substantially as and for the purposes set forth.

5. A testing stand for automobiles and the like, comprising a main driving shaft, a pair of driving pulleys secured upon said main driving shaft, said driving pulleys being adapted to be operated by the driving wheels of an automobile or the like, a counter-shaft provided with a hollow or chambered end, means for driving said counter-shaft from said main driving shaft, a drum provided with elongated slots in its circumferential wall secured to said counter-shaft, a housing loosely mounted upon said counter-shaft within said drum, movable fan-shafts supported by said housing, said fan-shafts passing through the respective elongated slots in said circumferential wall of said drum, fan-blades secured on free ends of said fan-shafts, a pinion upon each fan-shaft, a sliding shaft arranged in the hollow or chambered end of said counter-shaft, rack-members connected with said sliding shaft and meshing with said pinions on said fan-shafts, means for slidably operating said sliding shaft and said rack-members, a yieldable means connecting the said drums with said fan-shafts for imparting the revolving movement of said drum to said fan-shafts and fan-blades, and means for measuring and indicating the resistance of said fan-blades when revolved in the air, substantially as and for the purposes set forth.

6. A testing stand for automobiles and the like, comprising a main driving shaft, a pair of driving pulleys secured upon said main driving shaft, said driving pulleys being adapted to be operated by the driving wheels of an automobile or the like, a counter-shaft provided with a hollow or chambered end, means for driving said counter-shaft from said main driving shaft, a drum provided with elongated slots in its circumferential wall, a housing loosely mounted upon said counter-shaft within said drum, fan-shafts supported by said housing, said fan-shafts passing through the respective elongated slots in said circumferential wall of said drum, fan-blades secured upon the free ends of said fan-shafts, a pinion upon each fan-shaft, a sliding shaft arranged in the hollow or chambered end of said counter-shaft, rack-members connected with said sliding shaft and meshing with said pinions on said fan-shafts, and means for slidably operating said sliding shaft, comprising a flanged collar connected with said sliding shaft by means of a supporting pin, said counter-shaft being provided with slotted portions to permit the passage of said supporting pin therethrough, a slip-ring provided with studs arranged upon said flanged collar, a shifting-lever, a yoke-member connected with said shifting-lever and operatively secured to said studs of said slip-ring, and a yieldable means connecting the said drums with said fan-shafts for imparting the revolving movement of said drum to said fan-shafts and fan-blades, substantially as and for the purposes set forth.

7. A testing stand for automobiles and the like, comprising a main driving shaft, a pair of driving pulleys secured upon said main driving shaft, said driving pulleys being adapted to be operated by the driving wheels of an automobile or the like, a counter-shaft provided with a hollow or chambered end, means for driving said counter-shaft from said main driving shaft, a drum provided with elongated slots in its circumferential wall, a housing loosely mounted upon said counter-shaft within said drum, fan-shafts supported by said housing, said fan-shafts passing through the respective elongated slots in said circumferential wall of said drum, fan-blades secured upon the free ends of said fan-shafts, a pinion upon each fan-shaft, a sliding shaft arranged in the hollow or chambered end of said counter-shaft, rack-members connected with said sliding shaft and meshing with said pinions on said fan-shafts, and means for slidably operating said sliding shaft, comprising a flanged collar connected with said sliding shaft by means of a supporting pin, said counter-shaft being provided with slotted portions to permit the passage of said supporting pin therethrough, a slip-ring provided with studs arranged upon said flanged collar, a shifting-lever, a yoke-member connected with said shifting lever and operatively secured to said studs of said slip-ring, a yieldable means connecting the said drums with said fan-shafts for imparting the revolving movement of said drum to said fan-shafts and fan-blades, and means for measuring and indicating the resistance of said fan-blades when revolved in the air, substantially as and for the purposes set forth.

8. A testing stand for automobiles and the like, comprising a main driving shaft, a pair of driving pulleys secured upon said main driving shaft, said driving pulleys being adapted to be operated by the driving wheels of an automobile or the like, a counter-shaft provided with a hollow or chambered end, means for driving said counter-shaft from said main driving shaft, a drum provided with elongated slots in its circumferential wall, a housing loosely mounted upon said counter shaft within said drum, fan-shafts supported by said housing, said fan-shafts passing through the respective elongated slots in said circumferential wall of said drum, fan-blades secured upon the free ends of said fan-shafts, a pinion upon each fan-shaft, a sliding shaft arranged in the hollow or chambered end of said counter-shaft, rack-members connected with said sliding shaft and meshing with said pinions on said fan-shafts, and means for slidably operating said sliding shaft, comprising a flanged collar connected with said sliding-shaft by means of a supporting pin, said counter-shaft being provided with slotted portions to permit the passage of said supporting pin therethrough, a slip-ring provided with studs arranged upon said flanged collar, a shifting-lever, a yoke-member connected with said shifting lever and operatively secured to said studs of said slip-ring, means for imparting the revolving movement of said drum to said fan-shafts and fan-blades, comprising coil-springs, one end of each spring being secured to said drum, and the other end of each coil-spring being secured to a fan-shaft, substantially as and for the purposes set forth.

9. A testing stand for automobiles and the like, comprising a main driving shaft, a pair of driving pulleys secured upon said main driving shaft, said driving pulleys being adapted to be operated by the driving wheels of an automobile or the like, a counter-shaft provided with a hollow or chambered end, means for driving said counter-shaft from said main driving shaft, a drum provided with elongated slots in its circumferential wall, a housing loosely mounted upon said counter-shaft within said drum, fan-shafts supported by said housing, said fan-shafts passing through the respective elongated slots in said circumferential wall of said drum, fan-blades secured upon the free ends of said fan-shafts, a pinion upon each fan-shaft, a sliding shaft arranged in the hollow or chambered end of said counter-shaft, rack-members connected with said sliding-shaft and meshing with said pinions on said fan-shafts, and means for slidably operating said sliding shaft, comprising a flanged collar connected with said sliding shaft by means of a supporting pin, said counter-shaft being provided with slotted portions to permit the passage of said supporting pin therethrough, a slip-ring provided with studs arranged upon said flanged collar, a shifting-lever, a yoke-member connected with said shifting lever and operatively secured to said studs of said slip-ring, means for imparting the revolving movement of said drum to said fan-shafts and fan-blades, comprising coil-springs, one end of each spring being secured to said drum, and the other end of each coil-spring being secured to a fan-shaft, and means for measuring and indicating the resistance of said fan-blades when revolved in the air, substantially as and for the purposes set forth.

10. A testing stand for automobiles and the like, comprising a main driving shaft, a pair of driving pulleys secured upon said main driving shaft, said driving pulleys being adapted to be operated by the driving wheels of an automobile or the like, a counter-shaft provided with a hollow or chambered end, means for driving said counter-shaft from said main driving shaft, a drum provided with elongated slots in its circumferential wall, a housing loosely mounted upon said counter-shaft within said drum, fan-shafts supported by said housing, said fan-shafts passing through the respective elongated slots in said circumferential wall of said drum, fan-blades secured upon the free ends of said fan-shafts, a pinion upon each fan-shaft, a sliding shaft arranged in the hollow or chambered end of said counter-shaft, rack-members connected with said sliding shaft and meshing with said pinions on said fan-shafts, and means for slidably operating said sliding-shaft, comprising a flanged collar connected with said sliding shaft by means of a supporting pin, said counter-shaft being provided with slotted portions to permit the passage of said supporting pin therethrough, a slip-ring provided with studs arranged upon said flanged collar, a shifting-lever, a yoke-member connected with said shifting lever and operatively secured to said studs of said slip-ring, means for imparting the revolving movement of said drum to said fan-shafts and fan-blades, comprising coil-springs, one end of each spring being secured to said drum, and the other end of each coil-spring being secured to a fan-shaft, and means for measuring and indicating the resistance of said fan-blades when revolved in the air, comprising flexible cords connected with each fan-shaft and supported in connection with said drum, an indicator-disk slidably mounted in connection with said drum, said indicator-disk being connected with said flexible cords, a coil-spring in engagement with said indicator-disk and said drum, and a scale provided with graduations, substantially as and for the purposes set forth.

11. In a testing-stand for automobiles and the like, means for producing a variable resistance, comprising a shaft provided with a hollow or chambered end, a drum provided with elongated slots in its circumferential wall, a housing loosely mounted upon said shaft within said drum, fan-shafts supported by said housing, said fan-shafts passing through the respective elongated slots in said circumferential wall of said drum, fan-blades secured upon the free ends of said fan-shafts, a pinion on each fan-shaft, a sliding shaft arranged in the hollow or chambered end of said shaft, rack-members connected with said sliding-shaft and meshing with said pinions on said fan-shafts, means for operating said sliding shaft and its rack-members, and a yieldable means connecting the said drums with said fan-shafts for imparting the revolving movement of said drum to said fan-shafts and fan-blades, substantially as and for the purposes set forth.

12. In a testing-stand for automobiles and the like, means for producing a variable resistance, comprising a shaft provided with a hollow or chambered end, a drum provided with elongated slots in its circumferential wall, a housing loosely mounted upon said shaft within said drum, fan-shafts supported by said housing, said fan-shafts passing through the respective elongated slots in said circumferential wall of said drum, fan-blades secured upon the free ends of said fan-shafts, a pinion on each fan-shaft, a sliding shaft arranged in the hollow or chambered end of said shaft, rack-members connected with said sliding-shaft and meshing with said pinion on said fan-shafts, means for operating said sliding shaft and its rack-members, a yieldable means connecting the said drums with said fan-shafts for imparting the revolving movement of said drum to said fan-shafts and fan-blades, and means for measuring and indicating the resistance of said fan-blades when revolved in the air, substantially as and for the purposes set forth.

13. In a testing-stand for automobiles and the like, means for producing a variable resistance, comprising a shaft provided with a hollow or chambered end, a drum provided with elongated slots in its circumferential wall, a housing loosely mounted upon said shaft within said drum, fan-shafts supported by said housing, said fan-shafts passing through the respective elongated slots in said circumferential wall of said drum, fan-blades secured upon the free ends of said fan-shafts, a pinion on each fan-shaft, a sliding shaft arranged in the hollow or chambered end of said shaft, rack-members connected with said sliding-shaft and meshing with said pinions on said fan-shafts, a yieldable means connecting the said drums with said fan-shafts for operating said sliding shaft and its rack-members, means for imparting the revolving movement of said drum to said fan-shafts and fan-blades, and means for measuring and indicating the resistance of said fan-blades when revolved in the air, comprising flexible cords connected with each fan-shaft and supported in connection with said drum, an indicator-disk slidably mounted in connection with said drum, said indicator-disk being connected with said flexible cords, a coil-spring in engagement with said indicator-disk and said drum, and a scale provided with graduations, substantially as and for the purposes set forth.

14. In a testing stand for automobiles and the like, means for producing a variable resistance, comprising a shaft, a drum, and adjustable fan-members connected with said shaft and drum, and means for measuring and indicating the resistance of said fan-members when revolved in air, comprising flexible cords connected with each fan-member and supported in connection with said drum, an indicator-disk slidably mounted in connection with said drum, said indicator-disk being connected with said flexible cords, a coil-spring in engagement with said indicator-disk and said drum, and a scale provided with graduations arranged adjacent to said indicator-disk, substantially as and for the purposes set forth.

In testimony, that I claim the invention set forth above I have hereunto set my hand this 15th day of January, 1910.

INGLIS M. UPPERCU.

Witnesses:
  ADOLPH HANSEN,
  GEORGE D. RICHARDS.